United States Patent
Yamasaki et al.

(10) Patent No.: US 12,434,418 B2
(45) Date of Patent: Oct. 7, 2025

(54) DIE LIP OPENING/CLOSING DEVICE

(71) Applicant: KYORAKU CO., LTD., Kyoto (JP)

(72) Inventors: Yoshihiro Yamasaki, Yamato (JP); Shuji Ito, Yamato (JP); Tadatoshi Tanji, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 122 days.

(21) Appl. No.: 18/560,762

(22) PCT Filed: Mar. 30, 2022

(86) PCT No.: PCT/JP2022/016327
§ 371 (c)(1),
(2) Date: Nov. 14, 2023

(87) PCT Pub. No.: WO2022/244524
PCT Pub. Date: Nov. 24, 2022

(65) Prior Publication Data
US 2024/0246278 A1    Jul. 25, 2024

(30) Foreign Application Priority Data
May 21, 2021    (JP) .................................. 2021-086451

(51) Int. Cl.
*B29C 48/31*    (2019.01)

(52) U.S. Cl.
CPC ................... *B29C 48/313* (2019.02)

(58) Field of Classification Search
None
See application file for complete search history.

(56) References Cited

U.S. PATENT DOCUMENTS

| 4,704,083 A | 11/1987 | Iguchi et al. |
| 6,099,290 A * | 8/2000 | Gross .................... B29C 48/92 425/465 |
| 6,475,414 B1 | 11/2002 | Gross |
| 2013/0269868 A1 | 10/2013 | Neizert |

FOREIGN PATENT DOCUMENTS

| EP | 2563569 B1 | 6/2019 |
| EP | 2718086 B1 | 12/2020 |
| JP | S61291117 A | 12/1986 |

(Continued)

OTHER PUBLICATIONS

International Search Report issued on Jun. 14, 2022, in corresponding International Application No. PCT/JP2022/016327; 4 pages.

(Continued)

*Primary Examiner* — Yung-Sheng M Tsui
(74) *Attorney, Agent, or Firm* — Maier & Maier, PLLC

(57) ABSTRACT

Provided is a die lip opening/closing device capable of preventing wear and damage on an actuator of a pusher. According to the present invention, there is provided a die lip opening/closing device, the device including an opening/closing structure configured to open and close a die lip of a T-die in response to a linear motion of a pusher, and an actuator configured to actuate the pusher to move linearly, wherein the pusher includes a plurality of sub-pushers disposed along a longitudinal direction of the die lip, and the actuator is provided for each of the sub-pushers.

6 Claims, 3 Drawing Sheets

(56) References Cited

FOREIGN PATENT DOCUMENTS

| | | | |
|---|---|---|---|
| JP | S63246223 A | 10/1988 | |
| JP | H11511408 A | 10/1999 | |
| JP | 2020116846 A | 8/2020 | |
| WO | WO-2012170713 A1 * | 12/2012 | ......... B05C 11/1005 |
| WO | WO-2020153436 A1 * | 7/2020 | |

OTHER PUBLICATIONS

Extended Search Report issued on Sep. 24, 2024, in corresponding European Application No. 22804440.0, 9 pages.

* cited by examiner

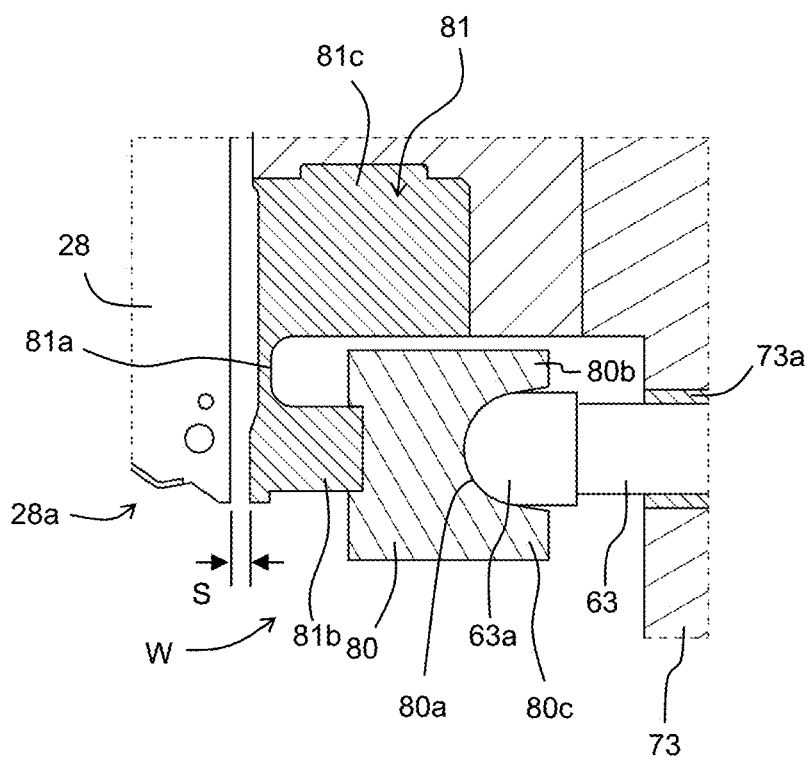

DIE LIP OPENING/CLOSING DEVICE

TECHNICAL FIELD

The present invention relates to a die lip opening/closing device.

BACKGROUND ART

Patent Literature 1 discloses a die lip opening/closing device configured to open and close a die lip of a T-die by linearly moving a pusher.

CITATION LIST

Patent Literature

[Patent Literature 1] JP-A-2020-116846

SUMMARY OF INVENTION

Technical Problem

The pusher of Patent Literature 1 has an elongated shape extending along the longitudinal direction of the die lip. Resin pressure from the resin in the T-die is applied to the pusher, but this pressure may not be applied evenly along the longitudinal direction of the die lip, which may cause the pusher to tilt. In addition, when forces applied to the pusher while the pusher is tilted are transmitted to an actuator, the actuator may be easily worn or damaged.

The present invention has been made in view of such circumstances, and an object thereof is to provide a die lip opening/closing device capable of preventing wear and damage on an actuator of a pusher.

Solution to Problem

According to the present invention, there is provided a die lip opening/closing device, the device including an opening/closing structure configured to open and close a die lip of a T-die in response to a linear motion of a pusher, and an actuator configured to actuate the pusher to move linearly, wherein the pusher includes a plurality of sub-pushers disposed along a longitudinal direction of the die lip, and the actuator is provided for each of the sub-pushers.

In the die lip opening/closing device of the present invention, the pusher is constituted by a plurality of sub-pushers, and the actuator is provided for each sub-pusher. The sub-pushers in the longitudinal direction have a length shorter than that of the pusher, and are thus hardly tilted by the resin pressure from resin in the T-die, preventing wear and damage on the actuator. Further, when a plurality of actuators are provided on one pusher without dividing the pusher, the pusher tends to be tilted due to deviations in the operation timing of the actuators; however, by constituting the pusher with a plurality of sub-pushers, tilting of the pusher due to deviations in operation timing can be prevented.

Hereinafter, various embodiments of the present invention will be presented by way of example. The following embodiments may be combined with each other.

Preferably, in the die lip opening/closing device described above, the actuator is constituted by a linear-acting cylinder.

BRIEF DESCRIPTION OF DRAWINGS

FIG. 3 is an enlarged view of a region A in FIG. 2B.

DESCRIPTION OF EMBODIMENTS

Embodiments of the present invention will be described below. Various characteristic features shown in the following embodiments may be combined with each other. In addition, the scope of the present invention is established independently for each of the features.

1. First Embodiment

Figure 1:
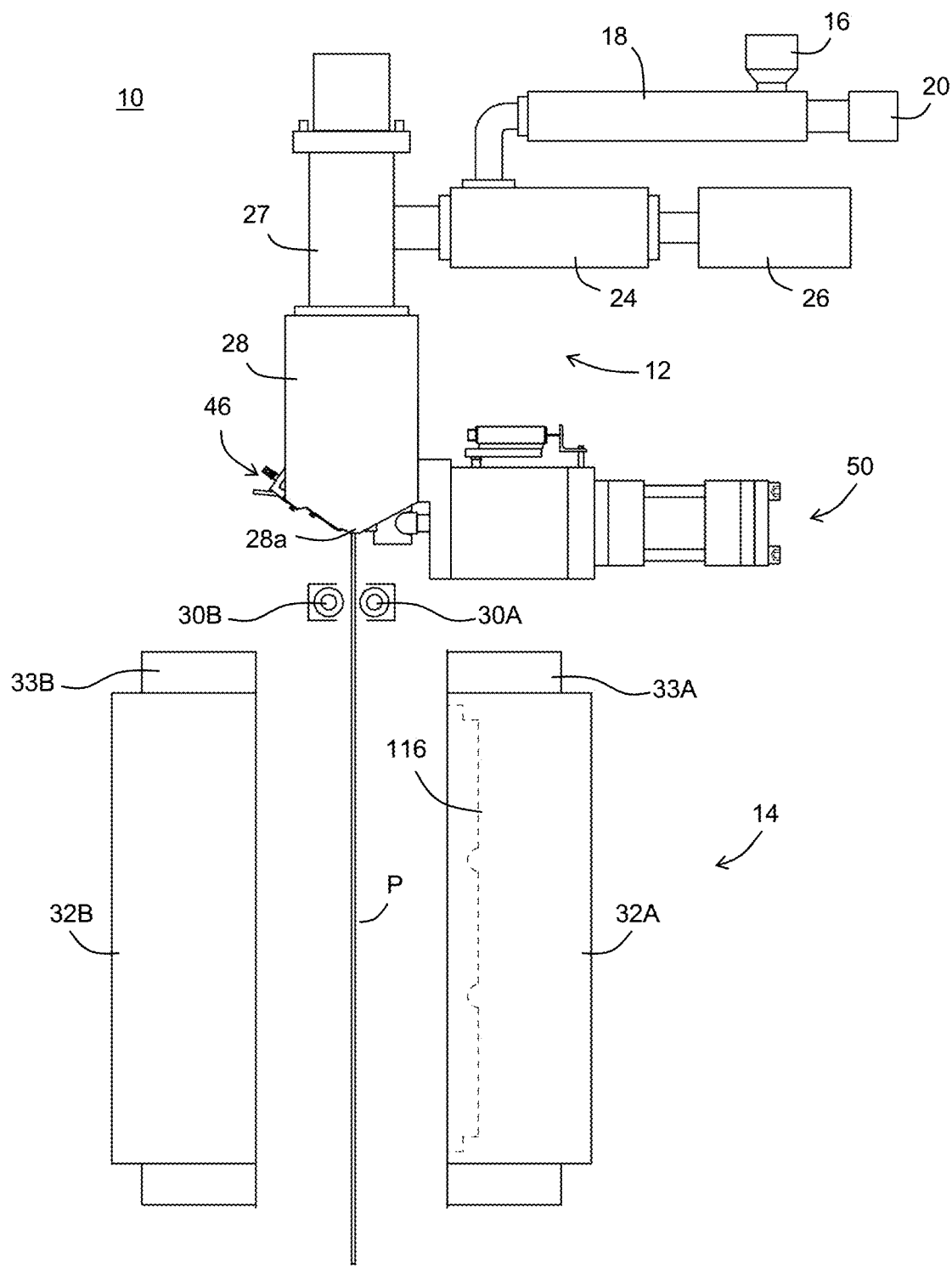
FIG. 1 is a schematic diagram showing a molding apparatus 10 including a die lip opening/closing device 50 of a first embodiment of the present invention.

As shown in FIGS. 1 to 2, a molding apparatus 10 of a first embodiment of the present invention includes a resin feeder 12 and a mold unit 14. The resin feeder 12 is provided with an extruder 18 including a hopper 16 and a hydraulic motor 20. Inside the extruder 18, there is provided a screw (not shown) connected to a hydraulic motor 20, which melts and kneads a resin fed from the hopper 16.

The extruder 18 is connected to an accumulator 24 including a plunger 26. The accumulator 24 is connected to a T-die 28 via a valve 27. The T-die 28 is provided with a die bolt 46 for adjusting a clearance amount S (see FIG. 3) of a slit of a die lip 28a of the T-die 28. The die lip 28a of the T-die 28 is opened and closed by a die lip opening/closing device 50, which will be described in detail below.

The resin is melted and kneaded in the extruder 18, and the accumulator 24 is filled with the resin. The plunger 26 operates such that the T-die 28 resin is filled with the resin filling the accumulator 24 at a high pressure. During the filling of the T-die 28 with molten resin, the die lip 28a of the T-die 28 is closed. When the accumulator 24 and T-die 28 are sufficiently filled with the amount of molten resin required for molding, the die lip opening/closing device 50 opens the die lip 28a, and a molten resin sheet P is extruded through the slit of die lip 28a.

The thermoplastic resin, which is the material of the molten resin sheet P, may be selected as desired. Examples thereof include a material obtained by adding a foaming agent to any one of polyolefins, such as polypropylene and polyethylene, and acrylic derivatives, such as polyamide, polystyrene, and polyvinyl chloride, or a mixture of two or more kinds thereof. For example, the molten resin sheet P may be made of a material containing foamed polystyrene and/or foamed polypropylene. Any physical foaming agents, chemical foaming agents, and mixtures thereof may be used as the foaming agent. Any inorganic physical foaming agents such as air, carbon dioxide gas, nitrogen gas, and water, and organic physical foaming agents such as butane, pentane, hexane, dichloromethane, and dichloroethane, and their supercritical fluids may be used as the physical foaming agent.

The mold unit 14 is disposed below the T-die 28 and includes molds 32A, 32B disposed to face each other. A cavity 116 is formed in the mold 32A. Rollers 30A, 30B are provided, below the T-die 28, between the molds 32A, 32B and T-die 28 and, which are disposed to face each other. After being extruded by the resin feeder 12, the molten resin sheet P passes between the rollers 30A, 30B while being fed downward by the rollers 30A, 30B, and is disposed between the molds 32A, 32B. It should be noted that the rollers 30A, 30B may also be eliminated. In this case, a decrease in the foaming magnification can be prevented, which may be caused by being sandwiched by the rollers 30A, 30B. According to the present invention, the thickness of the molten resin sheet P may be adjusted by adjusting the opening degree of the die lip 28a, thus eliminating the use of the rollers 30A, 30B. Further, the thickness of the molten resin sheet P may be continuously changed without using the rollers 30A, 30B by continuously changing the opening degree of the die lip 28a while extruding the molten resin sheet P. A gradual increase in the opening degree of the die lip during extrusion can prevent drawdown without using rollers 30A, 30B, thereby allowing the formation of a long molten resin sheet P in the vertical direction.

A mold frame 33A is provided on an outer periphery of the cavity 116 of the mold 32A. On the mold 32B, a mold frame 33B is provided facing the mold frame 33A. The mold frames 33A, 33B are formed in a substantially annular shape and formed so as to be movable in a direction approaching each other. The mold frames 33A, 33B contact the molten resin sheet P and sandwich the molten resin sheet P, making the space area enclosed by the mold 32A (cavity 116), the mold frame 33A, and the molten resin sheet P a sealed space. As necessary for molding, the space enclosed by the mold 32B, the mold frame 33B, and the molten resin sheet P is also made a sealed space. Then, when the molds 32A, 32B are closed and clamped, the internal air of the sealed space formed by the molten resin sheet P, the cavity 116, and the like is depressurized by a vacuum pump (not shown) to form the molten resin sheet P into the shape of the cavity 116. At this time, pressurized fluid may be fed into the space enclosed by the mold 32B, the mold frame 33B, and the molten resin sheet P. Incidentally, in addition to the molds (molds 32A, 32B) described above, a pair of molds may be used such that when the molds are closed, the cavity surfaces of the pair are disposed apart at a predetermined distance that is greater than the thickness of the molten resin sheet P. In this case, with the molten resin sheet P sandwiched and sealed between the pair of cavity surfaces, the molten resin sheet P is suctioned through minute suction holes provided on the cavity surfaces on both sides. This configuration allows the molten resin sheet P to be pulled in the thickness direction, thereby improving the foaming magnification. As a result, a foam molded product with high foaming magnification can be obtained.

Next, the die lip opening/closing device 50 will be described in detail with reference to FIG. 2. Upper and lower plates 71, 72 of a frame 70 of the die lip opening/closing device 50 are fixedly provided to the T-die 28 via a bracket 73. It should be noted that the upper and lower plates 71, 72 of the frame 70 shown in FIG. 2B are omitted in FIG. 2A.

An actuator 51 is fixed to a plate 74 of the frame 70 on the opposite side of the T-die 28. The actuator 51 operates under the control of a controller (not shown). In the present embodiment, the actuator 51 is a linear-acting cylinder and includes a cylinder 51a and a piston rod 51b. The piston rod 51b has a variable protrusion from the cylinder 51a. The power of the actuator 51 may be, but not limited to, hydraulic or electric.

A pusher 1 is provided on the T-die 28 side of the actuator 51. The pusher 1 is configured to move linearly, actuated by the actuator 51. The die lip 28a of the T-die 28 is configured to open and close in response to the linear motion of the pusher 1.

Figure 2A:
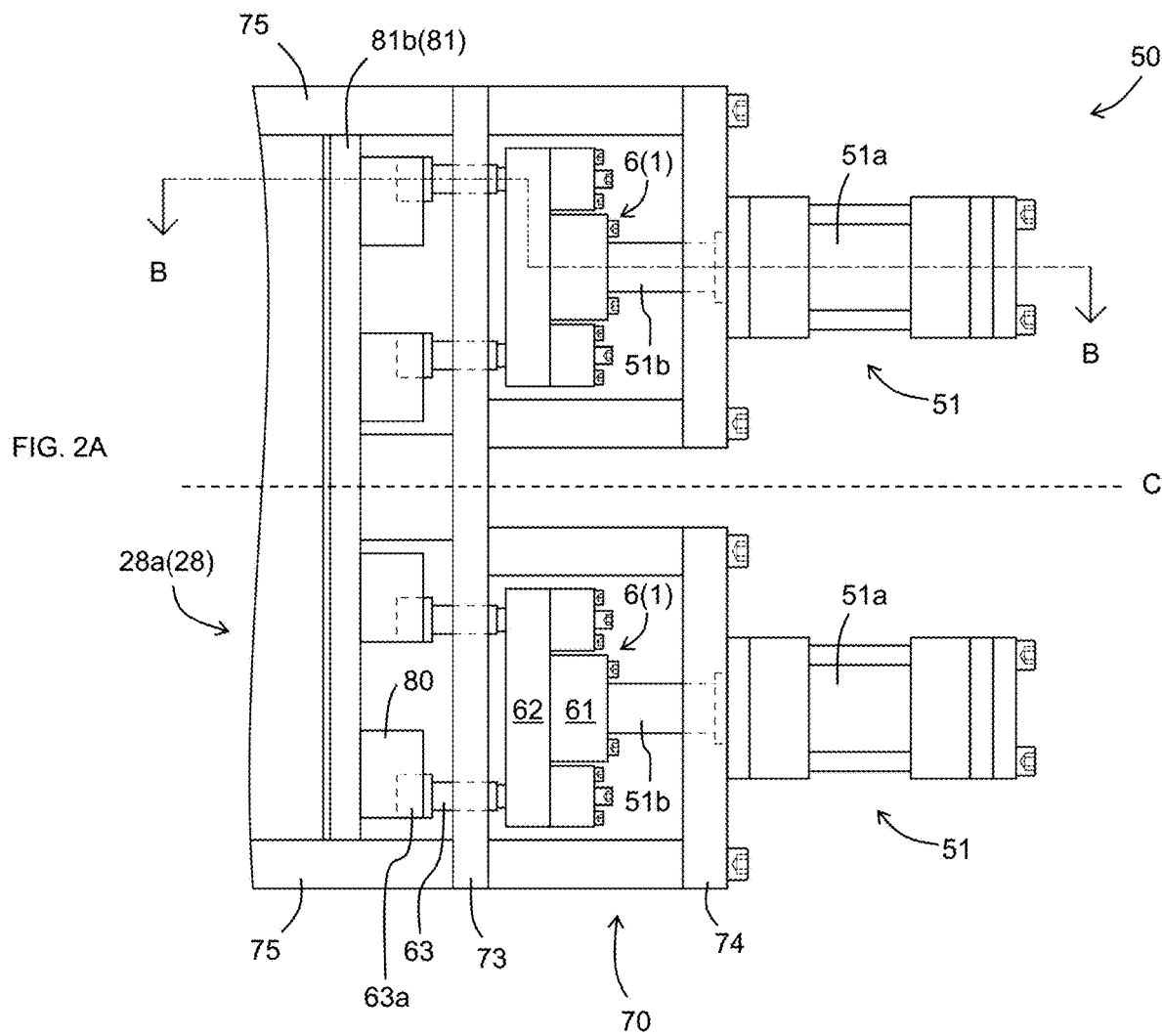
FIG. 2A is a bottom view of a main portion of the die lip opening/closing device 50 of FIG. 1.
Figure 2B:
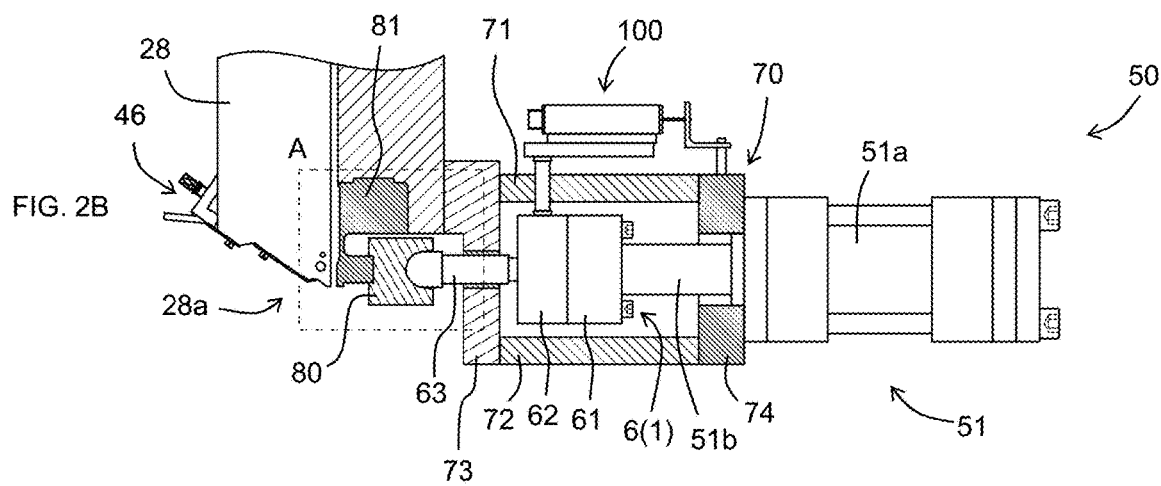
FIG. 2B is a front view of the die lip opening/closing device 50, showing a B-B cross-section in FIG. 2A for partial components.

The pusher 1 includes a plurality of sub-pushers 6 disposed along the longitudinal direction of the die lip 28a (vertical direction of FIG. 2A). The plurality of sub-pushers 6 are movable independently of each other. The sub-pushers 6 each include a bracket 61, a pusher base 62, and a pusher bar 63.

The pusher base 62 is linked to the piston rod 51b via the bracket 61. A plurality of substantially cylindrical pusher bars 63 are provided on the T-die 28 side of the pusher base 62. In the present embodiment, two pusher bars 63 are provided for each of the sub-pushers 6 in the longitudinal direction of the pusher base 62, and since there are two sub-pushers 6, a total of four pusher bars 63 are provided. As shown in FIG. 3, each pusher bar 63 is guided by a bushing 73a provided on the bracket 73 so as to be linearly movable. A pusher head 63a with an end curved when viewed from the side is formed at an end portion of each pusher bar 63. In Patent Literature 1, the pusher head 63a is provided in common for all the pusher bars 63, but in the present embodiment, the pusher head 63a is provided individually for each of the pusher bars 63. This configuration prevents the pusher base 62 from tilting due to resin pressure.

The actuator 51 is provided for each of the sub-pushers 6, and the plurality of actuators 51 operate in conjunction with each other, thereby enabling the linear motion of the pusher 1 constituted by the plurality of sub-pushers 6. As such, in the die lip opening/closing device 50 of the present embodiment, the pusher 1 is constituted by the plurality of sub-pushers 6, and each sub-pusher 6 is provided with the actuator 51. The sub-pushers 6 in the longitudinal direction have a length shorter than that of the pusher and are thus hardly tilted by the resin pressure from resin in the T-die 28, preventing wear and damage on the actuator 51. Further, when a plurality of actuators 51 are provided on one pusher 1 without dividing the pusher 1, the pusher 1 tends to be tilted due to deviations in the operation timing of the actuators 51; however, by constituting the pusher 1 with a plurality of sub-pushers 6, tilting of the pusher 1 due to deviations in operation timing can be prevented.

As shown in FIG. 2B, the pusher base 62 is connected to a position detection sensor 100. The position detection sensor 100 may be an eddy current type displacement sensor and be capable of detecting the position of the pusher 1. Other types of sensors, such as proximity sensors, can be used as the position detection sensor 100.

As shown in FIGS. 2A and 3, the T-die 28 is provided with a receiving piece 80 corresponding to the pusher bar 63. The plurality (four in the present embodiment) of pusher bars 63 and the receiving pieces 80 are each symmetrically disposed with respect to the longitudinal direction of the central plane C of the die lip 28a. This configuration makes it easier to apply pressure evenly to the die lip 28a.

As shown in FIG. 3, the receiving piece 80 is provided with an accommodating recess 80a for accommodating the pusher head 63a. A bottom of the accommodating recess 80a has a shape substantially complementary to the end of the pusher head 63a. To be more specific, the end of the pusher head 63a is curved, and the bottom of the accommodating recess 80a is curved in a similar manner. Preferably, the end of the pusher head 63a and the bottom of the accommodating recess 80a are cylindrically curved. The pusher head 63a is sandwiched between an upper wall 80b and a lower wall 80c in the accommodating recess 80a. This configuration keeps the pusher head 63a from rattling in the vertical direction within the accommodating recess 80a and stably holds the pusher head 63a. As shown in FIG. 3, the accommodating recess 80a extends toward the entrance side (pusher head 63a side) (that is, the length in the vertical direction of the accommodating recess 80a is longer), and the upper wall 80b and the lower wall 80c do not contact the pusher head 63a in the vicinity of the entrance of the accommodating recess 80a. This configuration makes it easier to accommodate the pusher head 63a in the accommodating recess 80a.

The receiving piece 80 is connected to the die lip piece 81 provided in the die lip 28a. The die lip piece 81 includes a bending portion 81a formed into a thin wall with a large substantially rectangular parallelepiped block cut out, a receiving piece connection 81b to which the receiving piece 80 is attached, and a fixing portion 81c fixed to a body of the T-die 28. That is, the receiving piece connection 81b and the fixing portion 81c are connected by the bending portion 81a. The opening/closing structure W configured to open and close the slit of the die lip 28a, indicated by the clearance amount S, includes the receiving piece 80 and the die lip piece 81.

The die lip 28a and the die lip piece 81 are sandwiched by a pair of side plates 75, and the slit of the die lip 28a is opened and closed while being guided by the side plates 75. This configuration enables stable opening and closing of the slit.

The die lip opening/closing device 50 operates as follows. In the case of filling the accumulator 24 or the T-die 28 with molten resin, the slit of the die lip 28a is required to be closed. In this case, each actuator 51 advances (linearly moves in the direction of T-die 28) each sub-pusher 6. When the pusher head 63a of the sub-pusher 6 advances, the pusher head 63a presses the receiving piece connection 81b through the receiving piece 80, and this causes the bending portion 81a to bend and the receiving piece connection 81b to rotate downward around the bending portion 81a portion. Then, the clearance amount S of the slit is reduced reaching to 0. In other words, the die lip 28a is closed.

Also, when the molten resin sheet P is extruded, each actuator 51 retracts each sub-pusher 6. When the pusher head 63a of the sub-pusher 6 retracts, the pressure of the receiving piece 80 by the pusher head 63a is released, and the receiving piece 80 and the receiving piece connection 81b return by the restoring force of the bending portion 81a of the die lip piece 81, allowing the die lip 28a (slit) to open.

2. Other Embodiments

In the above embodiment, the actuator 51 is a linear-acting cylinder, but it may be an actuator of the form having a motion conversion unit that changes the rotational movement of the drive shaft of the motor to the linear movement of the pusher as in Patent Literature 1.

In the above embodiment, the pusher head 63a is provided individually for each of the pusher bar 63, but the pusher head 63a may be provided in common for each of the plurality of pusher bars 63 belonging to the same sub-pusher 6. For example, as shown in FIG. 2A, a first pusher head common to two upper pusher bars 63 and a second pusher head common to two lower pusher bars 63 may be provided. In this case, the significance of constituting the pusher 1 with the plurality of sub-pushers 6 is hardly lost, and the number of components can be reduced.

REFERENCE SIGNS LIST

1: pusher, 6: sub-pusher, 10: molding apparatus, 12: resin feeder, 14: mold unit, 16: hopper, 18: extruder, 20: hydraulic motor, 24: accumulator, 26: plunger, 27: valve, 28: T-die, 28a: die lip, 30A: roller, 30B: roller, 32A: mold, 32B: mold, 33A: mold frame, 33B: mold frame, 46: die bolt, 50: die lip opening/closing device, 51: actuator, 51a: cylinder, 51b: piston rod, 61: bracket, 62: pusher base, 63: pusher bar, 63a: pusher head, 70: frame, 71: plate, 72: plate, 73: bracket, 73a: bushing, 74: plate, 75: side plate, 80: receiving piece, 80a: accommodating recess, 80b: upper wall, 80c: lower wall, 81: die lip piece, 81a: bending portion, 81b: receiving piece connection, 81c: fixing portion, 100: position detection sensor, 116: cavity, P: molten resin sheet, S: clearance amount, W: opening/closing structure

The invention claimed is:

1. A resin feeder comprising an extruder, an accumulator, and a T-die, wherein
the T-die comprises a die lip and a die lip opening/closing device comprising:
an opening/closing structure configured to open and close a die lip of a T-die in response to a linear motion of a pusher; and
an actuator configured to actuate the pusher to move linearly,
wherein the pusher comprises a plurality of sub-pushers disposed along a longitudinal direction of the die lip, and
the actuator is provided for each of the sub-pushers, wherein
the accumulator is configured to be filled with resin melted and kneaded in the extruder,
the T-die is configured to be filled with the resin filling the accumulator,
and configured that during the filling of the T-die with molten resin, the die lip is closed,
and configured that when the T-die is sufficiently filled with the molten resin required for molding, the die lip opening/closing device is configured to open the die lip, and a molten resin sheet is extruded through a slit of the die lip, wherein
each of the sub-pushers is provided with a pusher-bar, a pusher head is provided at an end portion of the pusher bar,
the opening/closing structure comprises a receiving piece and a die lip piece,
the die lip piece comprises a bending portion formed into a thin wall with a block cut out, a receiving piece connection to which the receiving piece is attached, and a fixing portion fixed to a body of the T-die,
the receiving piece connection and the fixing portion are connected by the bending portion, and
the pusher head is configured to press the receiving piece connection through the receiving piece.

2. The resin feeder of claim 1, wherein the actuator is constituted by a linear-acting cylinder.

3. The resin feeder of claim 1, wherein
the receiving piece is provided with an accommodating recess for accommodating the pusher head,
the pusher head is sandwiched between an upper wall and a lower wall in the accommodating recess,
the accommodating recess extends toward a side of an entrance of the accommodating recess, and the upper wall and the lower wall do not contact the pusher head in a vicinity of the entrance of the accommodating recess.

4. The resin feeder of claim 1, wherein each of the sub-pushers is provided with a plurality of the pusher bars.

5. The resin feeder of claim 2, wherein
the receiving piece is provided with an accommodating recess for accommodating the pusher head, the pusher head is sandwiched between an upper wall and a lower wall in the accommodating recess, the accommodating recess extends toward a side of an entrance of the accommodating recess, and the upper wall and the lower wall do not contact the pusher head in a vicinity of the entrance of the accommodating recess.

6. The resin feeder of claim 2, wherein each of the sub-pushers is provided with a plurality of the pusher bars.

* * * * *